US011623510B2

(12) United States Patent
Engerman

(10) Patent No.: US 11,623,510 B2
(45) Date of Patent: Apr. 11, 2023

(54) VEHICLE ELECTRIC DRIVE AXLE

(71) Applicant: Dana Automotive Systems Group, LLC, Maumee, OH (US)

(72) Inventor: Eric M. Engerman, Novi, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 17/644,061

(22) Filed: Dec. 13, 2021

(65) Prior Publication Data

US 2022/0203827 A1 Jun. 30, 2022

Related U.S. Application Data

(60) Provisional application No. 63/131,249, filed on Dec. 28, 2020.

(51) Int. Cl.
| | |
|---|---|
| *B60K 1/00* | (2006.01) |
| *B60K 17/04* | (2006.01) |
| *F16H 63/34* | (2006.01) |
| *F16H 57/02* | (2012.01) |
| *F16H 37/08* | (2006.01) |

(52) U.S. Cl.
CPC ............... *B60K 17/04* (2013.01); *B60K 1/00* (2013.01); *F16H 37/0813* (2013.01); *F16H 57/02* (2013.01); *F16H 63/3416* (2013.01); *B60K 2001/001* (2013.01); *F16H 2057/02034* (2013.01); *F16H 2057/02052* (2013.01)

(58) Field of Classification Search
CPC .... B60K 17/04; B60K 1/00; B60K 2001/001; F16H 37/0813; F16H 57/02; F16H 63/3416; F16H 2057/02034; F16H 2057/02052
See application file for complete search history.

(56) References Cited

U.S. PATENT DOCUMENTS

| | | | | |
|---|---|---|---|---|
| 9,303,745 | B2 * | 4/2016 | Wenthen | F16H 37/082 |
| 9,719,584 | B1 * | 8/2017 | Duan | B60K 17/02 |
| 9,822,860 | B2 * | 11/2017 | Kaltenbach | B60K 1/00 |
| 2019/0383373 | A1 * | 12/2019 | Engerman | F16H 3/54 |
| 2020/0189375 | A1 * | 6/2020 | Hayashi | F16H 57/02 |
| 2022/0196149 | A1 * | 6/2022 | Uehara | F16H 37/082 |

FOREIGN PATENT DOCUMENTS

| | | | |
|---|---|---|---|
| DE | 102015101042 A1 * | 7/2016 | |
| DE | 102019105998 A1 * | 5/2019 | ........... B60K 1/00 |
| DE | 102018008939 B3 * | 12/2019 | ........... B60K 1/00 |
| WO | WO-2014008897 A1 * | 1/2014 | ........... B60K 1/00 |

* cited by examiner

*Primary Examiner* — Sherry L Estremsky
(74) *Attorney, Agent, or Firm* — McCoy Russell LLP

(57) ABSTRACT

An electric drive axle in a vehicle is provided. The electric drive axle includes, in one example, an electric motor-generator, a gearbox, and a differential. The gearbox comprises a planetary gear set that includes a sun gear configured to rotate on a sun gear shaft directly coupled to a rotor of the electric motor-generator and an intermediate shaft that includes an idler gear rotationally coupled to a pinion gear that is rotationally coupled to the carrier.

18 Claims, 6 Drawing Sheets

US 11,623,510 B2

VEHICLE ELECTRIC DRIVE AXLE

CROSS-REFERENCE TO RELATED APPLICATION

The present application claims priority to U.S. Provisional Patent Application No. 63/131,249, entitled "VEHICLE ELECTRIC DRIVE AXLE", and filed Dec. 28, 2020. The entire contents of the above-listed application are hereby incorporated by reference for all purposes.

TECHNICAL FIELD

The present disclosure relates to an electric drive axle in a vehicle.

BACKGROUND AND SUMMARY

Electric and hybrid-electric vehicles harness electrical energy to operate a motor to deliver power to vehicle drive axles. Electric drive axle vehicles form one segment of the electric and hybrid vehicle market. Electric drive axles may be adapted for use in a variety of vehicle platforms due to their relatively small profile.

However, previous electric dive axles have presented issues with regard to axle assembly layout and packaging as well as gear train longevity, as recognized by the inventor. For instance, arranging an electric motor coaxial with the axle shafts may pose clearance issues and may in certain scenarios necessitate tradeoffs to be made between axle structural integrity and compactness. Gearbox clutches, in certain electric drive axles, increase the complexity of the gearbox and present challenges with regard to power transfer interruption during transient shifting states. Because of the added complexity, the likelihood of component degradation is increased. Further, the clutches may prompt shorter gear train maintenance intervals.

To address at least some of the aforementioned drawbacks, an electric drive axle is provided. The drive axle includes a motor-generator, a gearbox, and a differential. Within the gearbox resides a planetary gear set with a sun gear shaft coupled to a rotor shaft of the motor. The gearbox further includes an intermediate shaft. An idler gear on the intermediate shaft meshes with a pinion gear included in the carrier of the planetary arrangement. An output gear on the intermediate shaft meshes with an output gear (e.g., bevel gear) in the differential. In this way, a compact electric axle is achieved.

In another example, the electric drive axle may further include a park lock mechanism. This mechanism includes an actuator designed to prevent the rotation of the sun gear shaft. To carry out this park lock feature, a parking gear may be coupled to a section of the sun gear shaft which extends through an opening in the carrier. In this way, the axle's functionality can be expanded to include a park lock feature in a space efficient manner. Allowing the parking gear to be positioned coaxial to the sun gear, reduces the likelihood of the parking gear constraining the layout of components such as suspension components coupled to the axle, for instance. The drive axle's applicability and customer appeal may be correspondingly increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2-6 are drawn approximately to scale. However, other relative dimensions may be used, in other embodiments.

DETAILED DESCRIPTION

An electric drive axle is described herein. The drive axle efficiently packages a gearbox (e.g., three stage reduction gearbox) into the axle assembly. The gearbox includes a planetary gear set rotationally coupled to a rotor shaft in an electric motor-generator. In the planetary gear set, a sun gear serves as an input and a carrier with a pinion gear serves as the planetary gear set's output. The carrier's pinion gear meshes with an idler gear on an idler shaft. An output gear additionally resides on the intermediate shaft and meshes with a bevel gear in a differential. Directly coupling the planetary gear set to the rotor shaft allows the gearbox to achieve a targeted gear ratio. Further, providing an idler shaft with an idler gear that meshes with the planetary arrangement enables the axle have a parallel motor configuration (an arrangement with the motor's rotational axis parallel to the differential's rotational axis). The parallel motor arrangement, allows the structural design of the motor to be decoupled from certain axle packaging constraints, when compared to axles with motors arranged coaxial with axle shafts. The gearbox may further include a park lock mechanism with a parking gear coupled to a sun gear shaft section that extends through a central carrier opening. In this way, the axle's functionality can be expanded to include park lock functionality using a compact assembly. This results in a reduction in the space constraints posed by the drive axle on other vehicle systems.

Figure 1:
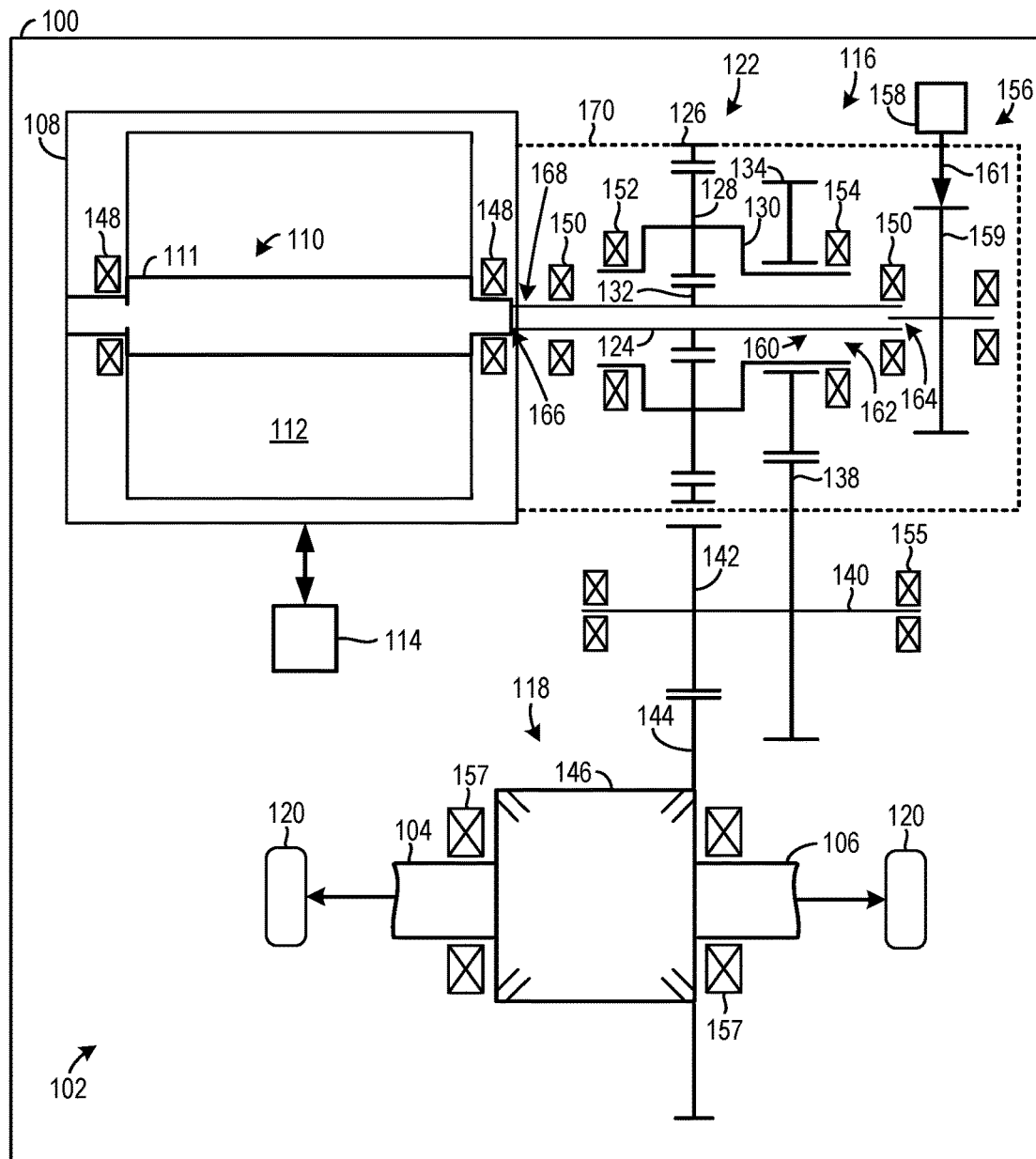
FIG. 1 shows a schematic depiction of a vehicle with an electric drive axle system.

FIG. 1 illustrates a vehicle 100 with an electric drive axle 102. The vehicle 100 may be a battery electric vehicle where one or more electric drive axles are used for motive power generation. Hybrid type electric vehicles have also been envisioned where an internal combustion engine is used along with an electric drive axle for motive power generation. For instance, an internal combustion engine may drive a second axle in the vehicle. However, numerous hybrid vehicle designs have been contemplated. It will be appreciated that the vehicle 100 may take a variety of forms such as a passenger vehicle, an off-road vehicle, a light duty vehicle, a medium duty vehicle, a heavy duty vehicle, and the like. Although the vehicle is schematically illustrated in FIG. 1, the vehicle may have structural features that are not captured by the schematic illustration.

An axis system is provided in FIG. 1 as well as FIGS. 2-6, for reference. The axis system includes a z-axis, a y-axis, and an x-axis. The z-axis may be parallel to a gravitational axis, the x-axis may be a lateral axis, and/or the y-axis may be a longitudinal axis. However, the axes may have other orientations, in other examples.

The electric drive axle 102 may be a beam axle that is weight bearing. The beam axle includes a set of wheels laterally connected by axle shafts. To elaborate, the beam axle may include a continuous structure extending between the wheels to enable the camber angle between the wheels to remain substantially equivalent as the axle moves through the travel of the suspension system. Providing an electric beam axle may allow the durability of the vehicle's drivetrain to be increased and may have benefits with regard to traction and braking when compared to other suspension designs such as independent axle suspension designs. To elaborate, beam axles may have increased durability, increased load carrying capacity, and may allow for greater articulation when compared to vehicles using independent suspension designs, for example.

The electric drive axle 102 may be a front or rear axle and may be a steerable axle, in some embodiments, or a non-steerable axle, in other embodiments. In any of these embodiments, the electric motor-generator in the drive axle may be positioned longitudinally offset from shaft sections (e.g., half shafts) 104, 106 with regard to the x-axis. Positioning the electric motor-generator longitudinally offset from the shaft sections enables the motor to be space efficiently integrated into the drive axle. In other embodiments, however, the electric motor-generator may be axially aligned with the shaft sections.

The electric drive axle 102 includes an electric machine 108 (e.g., motor-generator or motor). The electric machine 108 includes a rotor 110 with a shaft 111 and a stator 112 which, during use, electromagnetically interact to generate rotational output and, in the motor-generator example, generate electrical energy, during generator operation. The rotor 110 and the stator 112 may include components such as stator windings, rotor laminations, rotor windings, electrical interfaces, magnets, etc. to achieve the abovementioned functionality. An energy storage device 114 (e.g., a battery, a capacitor, and the like) may be electrically coupled to the electric machine 108 and therefore may transfer energy to and, in the motor-generator configuration, receive energy from the electric machine 108.

A variety of suitable electric motor configurations may be used depending on the end-use design goals. For instance, alternating current (AC) motors have been envisioned. AC motors may be used due to their higher energy conversion efficiency, higher power density, greater reliability, and less maintenance which may at least partially stem from the reduction (e.g., avoidance) of mechanical wear between the stator and rotor, and regenerative braking efficacy in comparison to direct current (DC) motors. Although, DC motor variants may be used in some scenarios. AC motor types include asynchronous (e.g., squirrel cage and wound rotor) and synchronous style motors. Synchronous motors, such as three, six, or nine phase, may be used in certain embodiments. The multiphase motor styles that may be used in the electric axle include permanent magnet, synchronous reluctance, synchronous induction, and hysteresis. In one use-case example, a permanent magnet or other suitable synchronous AC motor may be utilized, due to its high conversion efficiency. However, in other instances, an induction AC motor may be used due to its lower component cost in comparison to permanent magnet motors utilizing costlier metals. Further, in the case of an AC motor, the motor may receive electrical energy from an inverter or have an inverter incorporated therein, in some instances.

The electric drive axle 102 further includes a gearbox 116 and a differential 118. In a drive mode, power flows from the electric machine 108 through the gearbox 116 and differential 118 to drive wheels 120. The gearbox 116 is a three stage gearbox, in the illustrated example. Providing a three stage gearbox allows the drive axle to achieve a compact parallel motor arrangement with a targeted gear ratio without unduly impacting axle packaging efficiency. In one use-case example, the gear ratio may be approximately 8:1. Although the gearbox may have additional stages, in other examples. Adding more gear reduction stages may allow the gear ratio to be increased, which however decreases gearbox compactness.

The gearbox 116 includes a planetary gear set 122 with a sun gear shaft 124. Arranging the planetary gear set 122 on the sun gear shaft 124 allows the gearbox to have a targeted gear ratio in a space efficient package.

The planetary gear set 122 may include a ring gear 126, planet gears 128 that rotate on a carrier 130, and a sun gear 132. The sun gear 132 may function as an input of the planetary gear set 122, in one example. Further, in such an example, the carrier 130 serves as an output of the planetary gear set. However, other input-output gear configurations for the planetary gear set have been contemplated. Additionally, the ring gear 126 may be grounded. To elaborate, the ring gear may be grounded using a gearbox housing, in one instance. In this way, the electric drive axle's compactness may be increased when compared to axles that ground the ring gear via a separate component. Further, a housing 170 (e.g., a one-piece housing) may at least partially enclose the gearbox 116. The housing 170 may also function to ground the ring gear 126.

The carrier 130 includes a pinion gear 134. To elaborate, the pinion gear 134 may be coupled (e.g., welded, integrally formed, press fit, and/or mechanically attached) to a carrier body.

In turn, the pinion gear 134 is rotationally coupled to an idler gear 138 on an intermediate shaft 140 (e.g., idler shaft). An output gear 142 on the intermediate shaft 140 may be coupled to a gear 144 (e.g., bevel gear) in the differential 118. In turn, the differential 118 transfers power to axle shafts 104, 106 which are rotationally coupled to the drive wheels 120.

The differential 118 may be a bevel gear differential that further includes a housing 146 which at least partially encloses spider gears, side gears, and the like to permit speed differentiation between the axle shafts. However, other types of differentials may be used in alternate examples, such as planetary style differentials which may be more time intensive to manufacture, assemble, and repair, in some cases. The differential may, in one example, include a locking device such as an electronic locking device or a pneumatic locking device. The locking device functions to prevent axle shaft speed differentiation during selected periods to increase vehicle traction.

Bearings 148 may be included in the electric machine 108 that allow rotor rotation. As described herein a bearing is a component that constrains motion of another component and allows the component to rotate and support radial loads and in some cases axial loads, in the case of a thrust style bearing. A bearing may include races (inner and outer races) and roller elements (e.g., balls, cylinders, tapered cylinders, and the like) although magnetic bearings, plain bearings, etc. may be used in some circumstances. Bearings 150 may be coupled to the sun gear shaft 124, bearings 152, 154 may be coupled to the planetary gear set 122, bearings 155 may be coupled to the intermediate shaft 140, and bearings 157 may be coupled to the axle shafts 104, 106. To expound, bearings 152, 154 may be coupled to opposing axial sides of the carrier 130.

A park lock mechanism 156 may further be included in the drive axle 102. The park lock mechanism 156 may include an actuator unit 158 that may be electronically, pneumatically, and/or hydraulically actuated. The actuator unit 158 may include a shift fork or other mechanism that is designed to interact with a parking gear 159 to selectively inhibit motion of the parking gear, denoted via arrow 161. The sun gear shaft 124 may include an extended portion 160 that traverses a central opening 162 in the carrier 130. The extended portion may be included in the park lock mechanism 156. Further, the parking gear 159 may be located at a first end 164 of the sun gear shaft 124 and an interface 166 with the rotor shaft 111 is located at the opposing second end 168 of the sun gear shaft 124. In this way, the park lock mechanism 156 may be space efficiently incorporated into the planetary gear set. Further, positioning the parking gear 159 coaxial with the sun gear 132 allows the likelihood of the park lock mechanism posing space constraints on other components such as suspension system components, may be reduced. Consequently, the gearbox's functionality can be expanded to include a park lock feature in compact manner.

A lubrication system may additionally be provided in the gearbox 116. The lubrication system may be a forced lubrication system that deploys pressurized conduits, nozzles that generate oil jets, bearings with circulating oil, etc. to lubricate the gears. Alternatively, the lubrication system may be a splash lubrication type system.

Figure 2:
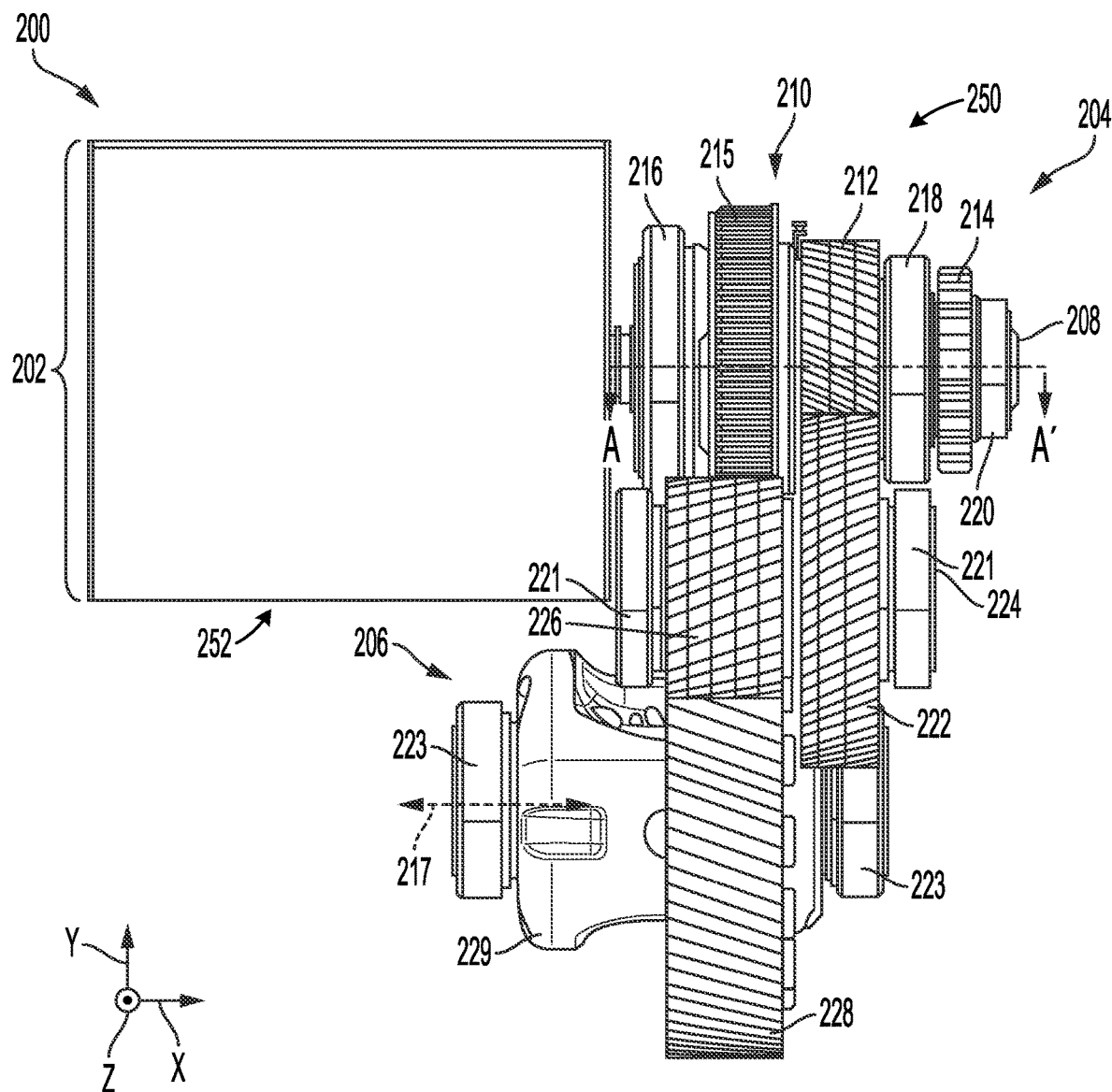
FIG. 2 shows a top view of a first example of an electric drive axle.

FIG. 2 depicts a first example of an electric drive axle 200. The electric drive axle 200 is an example of the drive axle 102, shown in FIG. 1. As such, the axles may share common structural and/or functional features. Repeated description of these common features is therefore omitted.

The electric drive axle 200 includes an electric motor-generator 202, a gearbox 204, and a differential 206. The gearbox 204 again includes a sun gear shaft 208 with a planetary gear set 210 and a parking gear 214 positioned thereon. The planetary gear set may include a ring gear 215, a carrier on which planet gears reside, and a sun gear. Thus, in the planetary assembly, the planet gears mesh with both the ring gear and the sun gear. The electric motor-generator is shown axially offset from a rotational axis 217 of the differential 206. A pinion gear 212 may be coupled to a body of a carrier in the planetary gear set, described in greater detail herein. The planetary gear set 210 may function as first stage reduction in the gear train and the gears on the intermediate shaft and the gears meshing therewith may function as the second and third stages of a three stage reduction. Thus, the gearbox 204 may be a three stage gearbox, in one example. Using a three stage gearbox allows the electric axle to achieve a desired gear ratio as well as packaging efficiency. However, in other examples, the gearbox may have four or more stages.

Further, a housing (e.g., a one-piece housing) may enclose the gearbox 204 shown in FIG. 2. In such an example, the ring gear 215 may be grounded by the housing and/or the housing may have an access cover for accessing of the gearbox. In another example, the housing may have a clamshell style construction which encloses the gearbox and a park lock mechanism 250.

The park lock mechanism 250 includes the parking gear 214. The park lock mechanism may further include a shift fork or other suitable mechanism designed to mesh with the parking gear 214 and arrest motion thereof during park lock engagement. Conversely, during park lock disengagement, the parking gear is permitted to rotate.

The pinion gear 212 meshes with an idler gear 222 on an intermediate shaft 224. An output gear 226 further resides on the intermediate shaft 224. The output gear 226 meshes with a differential gear 228 (e.g., bevel gear). Thus, the pinion gear is directly coupled to the idler gear and the output gear is directly coupled to the differential gear. The output gear 226 is positioned axial closer to the motor-generator 202 than the idler gear 222. In this way, the gearbox may form a compact arrangement.

The differential gear may drive gears such as spider gears and side gears in the differential 206 which transfer power to axle shafts. A case 229 of the differential 206 is further depicted in FIG. 2. The case may house and facilitate rotation of spider gears in the differential.

Bearings 216, 218 may be coupled to the carrier or other components in the planetary assembly to facilitate rotation thereof. The bearing 216 may be a spherical roller bearing and the bearing 218 may be a cylindrical roller bearing. Bearing 220 is provided in the gearbox 204 and is rotationally coupled to an axial extension of the parking gear 214. The parking gear shaft is coupled to the sun gear shaft. Bearings 221 are coupled to the intermediate shaft 224. Bearings 223 are coupled to the differential 206.

The parking gear 214 is shown axially further away from the electric motor-generator 202 than the idler gear 222. Positioning the parking gear in this manner may allow for more efficient installation of the parking gear as well as more efficient servicing of the park lock mechanism. Further, the gears 215, 226, and 228 may have similar position along the x-axis or an axis parallel to the x-axis. Further, the gears 212 and 222 may be position axially further away from the electric motor-generator 202 as the gears 215, 226, and 228. When the gears are arranged in this manner, the differential 206 may be positioned at least partially on a side 252 of the electric motor-generator 202. Cutting plane A-A' indicates the cross-sectional view depicted in FIG. 3.

Figure 3:
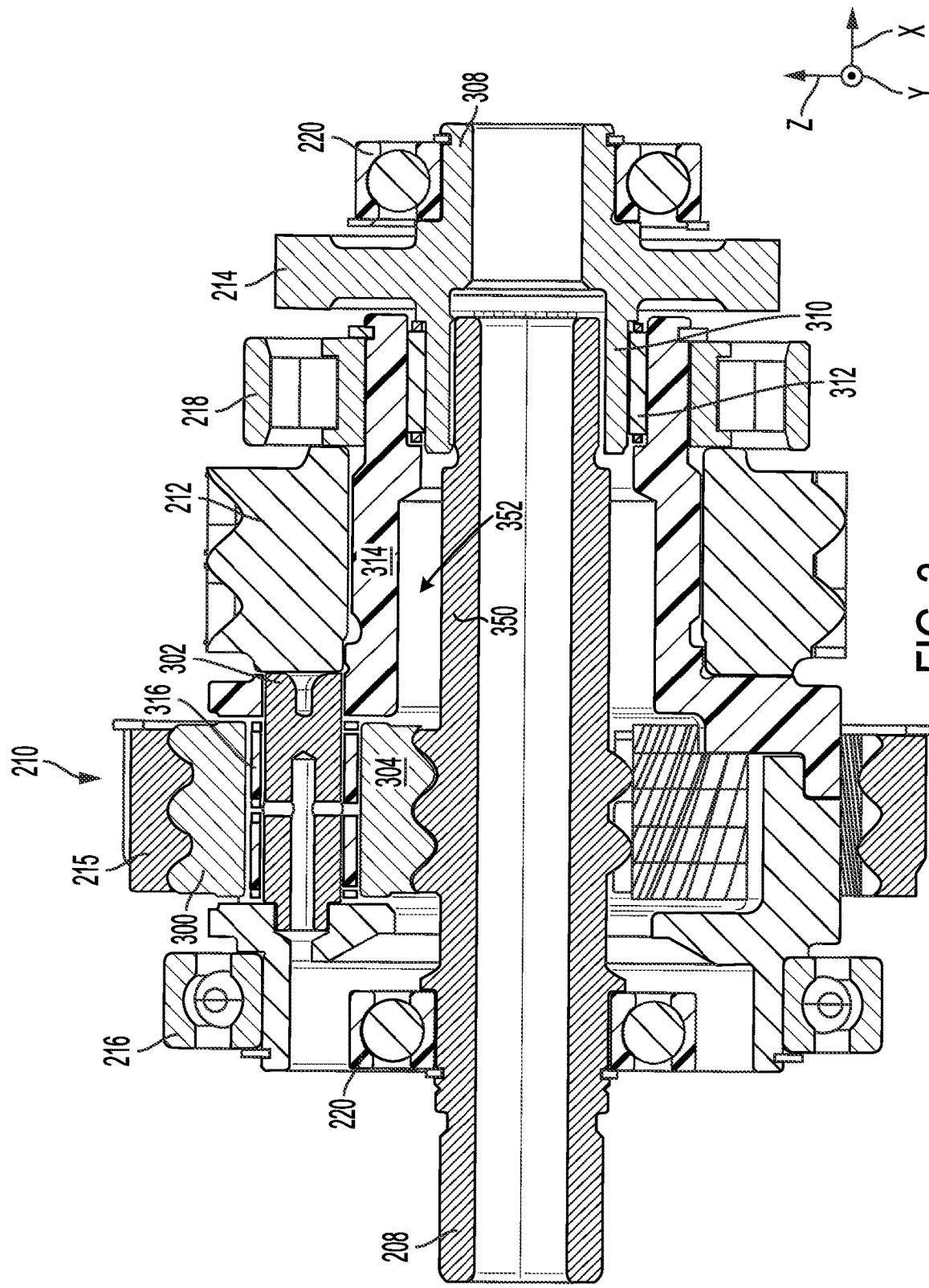
FIG. 3 shows a cross-sectional view of a sun gear shaft arrangement included in the electric drive axle, depicted in FIG. 2.

FIG. 3 shows a detailed illustration of the sun gear shaft 208 with the planetary gear set 210 that includes the ring gear 215, planet gears 300 on a carrier 302, and a sun gear 304. The pinion gear 212 and the parking gear 214 coupled to the sun gear shaft are further illustrated in FIG. 3. Specifically, in one example, the planetary gear set 210 may be a simple planetary gear set that includes solely the ring gear, the planet gears, the carrier, and the sun gear. The carrier 302 includes a body 314 on which the pinion gear 212 resides. Thus, the carrier 302 drives rotation of the of the pinion gear 212.

Bearing 220 may be coupled to a first axial extension 308 of the parking gear 214. A second axial extension 310 of the parking gear 214 may be coupled to the sun gear shaft 208. Thus, the parking gear may be press fit, welded, mechanically coupled, etc. to the sun gear shaft. A bearing 312 may be arranged between the axial extension 310 and a body 314 of the carrier 302. To elaborate, the bearing 312 may be coupled to the carrier body 314 and the extension 354 of the parking gear 214. In this way, the parking gear may be compactly incorporated into the planetary assembly. The pinion gear 212 is shown coupled to (e.g., press fit, splined, mechanically attached, or welded to) the carrier body 314.

A section 350 of the sun gear shaft 208 may extend through an opening 352 of the carrier body 314. Further, the parking gear extension 310 may be coupled to (e.g., press fit, splined, or welded to) the section 350 of the sun gear shaft 208.

The bearing 218 is shown coupled to the body 314 of the carrier 302. The bearings 316 attached to the planet gears 300 and the carrier 302 are further illustrated in FIG. 3.

Figure 4:
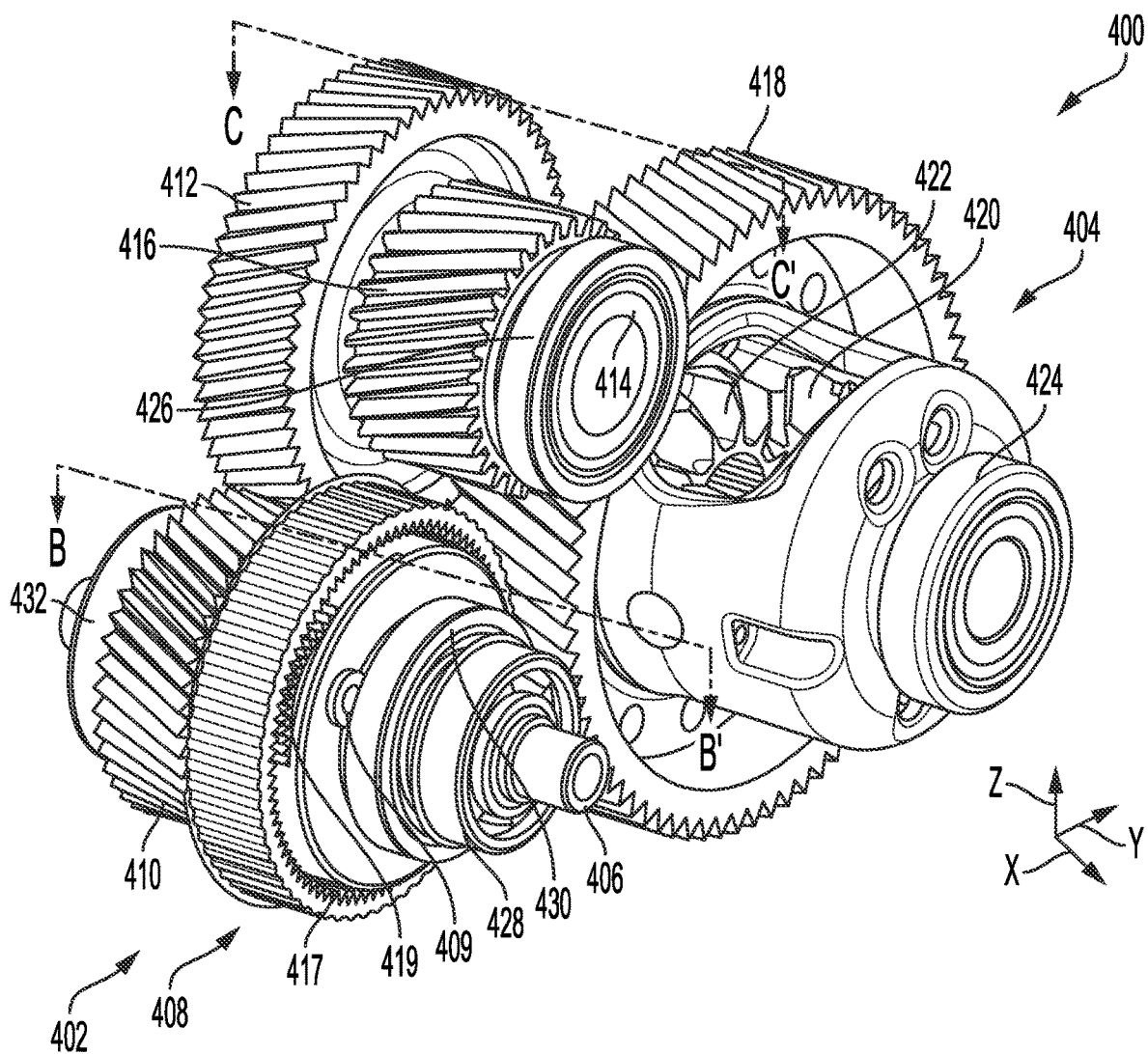
FIG. 4 shows a perspective view of a second example of an electric drive axle.

FIG. 4 depicts a second example of an electric drive axle 400. The electric drive axle 400 again includes a gearbox 402 rotationally coupled to a differential 404. The gearbox 402 includes a sun gear shaft 406 with a sun gear of a planetary gear set 408 coupled to the sun gear shaft. The carrier 409 in the planetary gear set includes a pinion gear 410 that meshes with an idler gear 412 on an intermediate shaft 414. An output gear 416 in the intermediate shaft meshes with a bevel gear 418 in the differential 404. The ring gear 417 and the planet gears 419 of the planetary arrangement are additionally depicted in FIG. 3.

FIG. 4 additionally shows spider gears 420 and side gears 422 in the differential 404. Bearings 424 of the differential are again depicted along with bearings 426 on the intermediate shaft 414 and bearings 428, 430, 432 on the sun gear shaft 406. Bearings 430 and 432 may be designed as thrust bearings that include tapered rollers positioned between their inner and outer races. The thrust bearings may support axial loads from the planetary gear set 408. Additionally, the bearing 428 may be a spherical roller bearing. Still further in one example, the bearings 426 may be thrust bearings. However, other bearing configurations have been envisioned.

Figure 6:
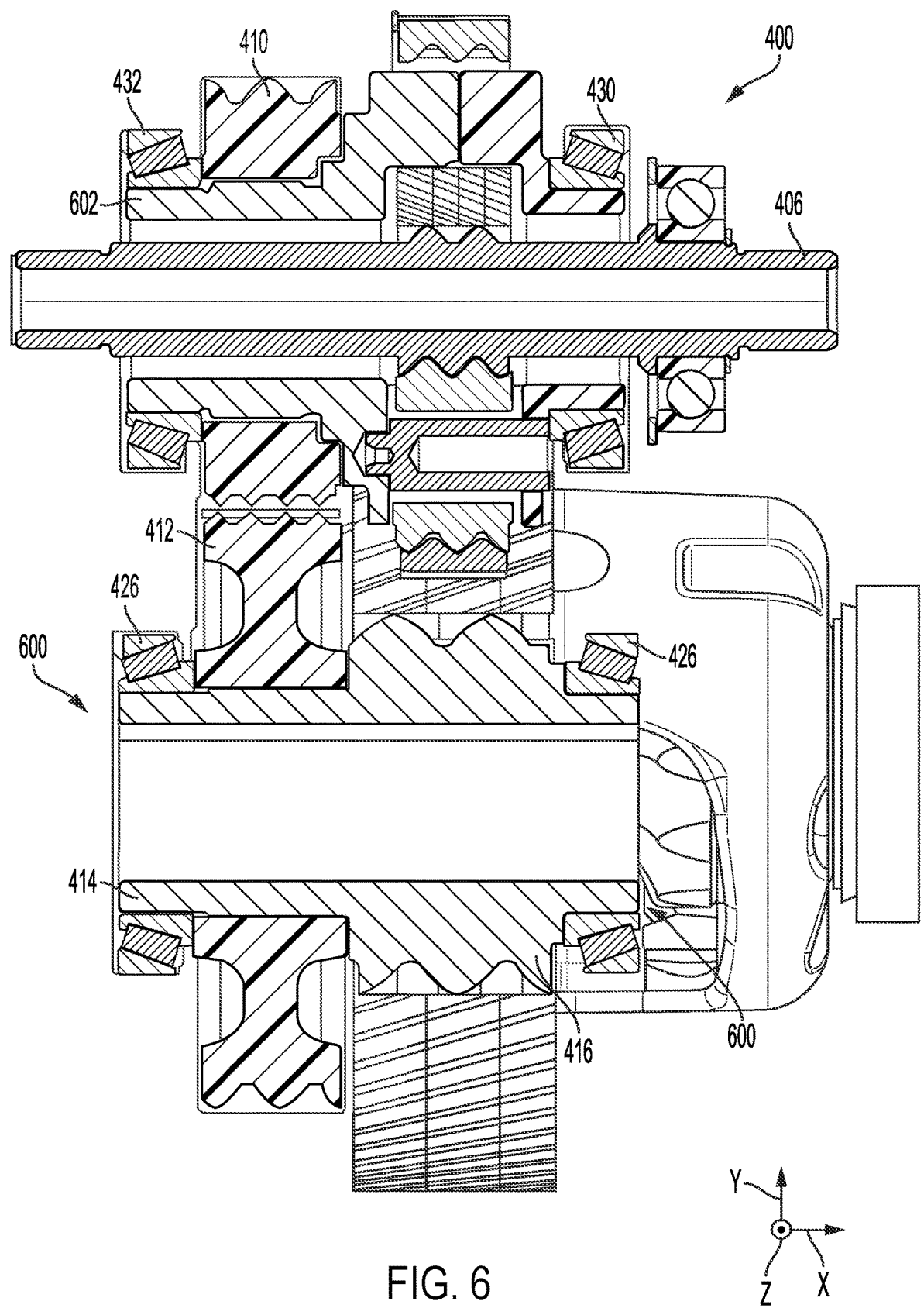
FIG. 6 shows a cross-sectional view of the sun gear shaft and differential included in the electric drive axle, depicted in FIG. 4.

Cutting plane B-B' indicates the cross-sectional view shown in FIG. 4 and cutting plane C-C' indicates the cross-sectional view depicted in FIG. 6.

Figure 5:
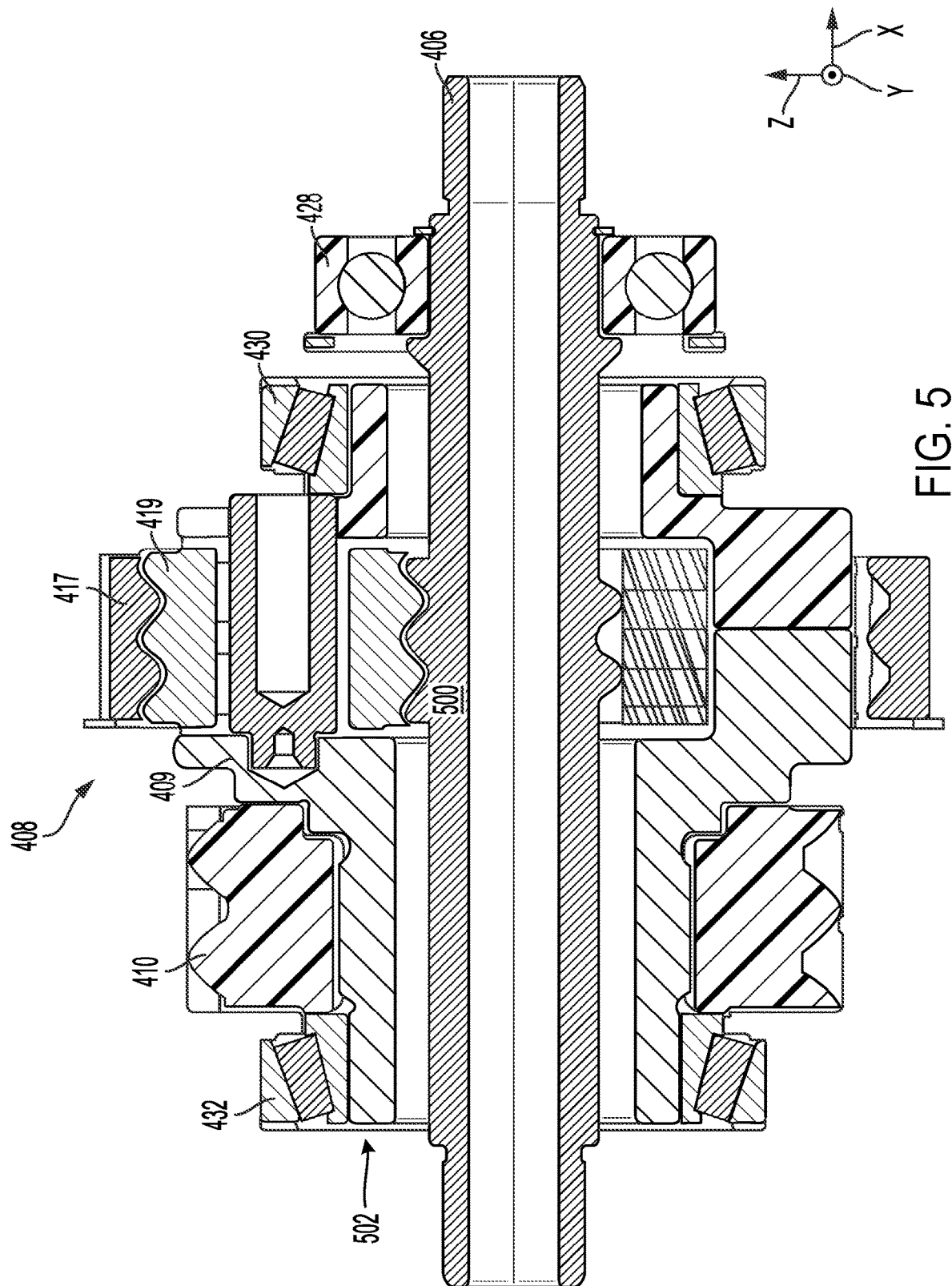
FIG. 5 shows a cross-sectional view of a sun gear shaft assembly included in the electric drive axle, depicted in FIG. 4.

FIG. 5 depicts the sun gear shaft 406 with the planetary gear set 408. The pinion gear 410, carrier 409, planet gears 419, ring gear 417, and a sun gear 500 is further shown. The sun gear 500 may be machined on the sun gear shaft, in one example. In this way, the structural integrity of the sun gear and shaft may be increased. Alternatively, the sun gear may be welded and/or otherwise mechanically attached to the sun gear shaft. Bearings 428, 430, and 432 are again illustrated in FIG. 5. The bearing 432 may be coupled to an end 502 of the carrier 409 axially outboard of the pinion gear 410.

FIG. 6 illustrates a cross-sectional view of the sun gear shaft 406 and intermediate shaft 414. Bearings 426 are positioned on axial opposing ends 600 of the shaft 414. The idler gear 412 that meshes with the pinion gear 410 and the output gear 416 are axially positioned between the bearings 426. The idler gear 412 may be press fit, machined, or otherwise integrally formed with the intermediate shaft 414. Further, the pinion gear 410 may be coupled (e.g., press fit or welded) to a body 602 of the carrier 409. In this way, the installation efficiency of the pinion gear with regard to the planetary gear set assembly is increased. Further, thrust bearings 430 and 432 may be coupled to opposing sides of the body 602 of the carrier 409 to support axial loads from the planetary gear set.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electric drive axle is provided that comprises an electric motor-generator; a gearbox comprising: a planetary gear set that includes a sun gear configured to rotate on a sun gear shaft directly coupled to a rotor of the electric motor-generator, wherein the planetary gear set includes a carrier that comprises a pinion gear; and an intermediate shaft that includes an idler gear and an output gear coupled thereto, wherein the idler gear is rotationally coupled to the pinion gear; and a differential that includes an input gear directly coupled to the output gear.

In another aspect, an electric beam axle is provided that comprises an electric motor-generator; a three stage gearbox comprising: a planetary gear set that includes: a sun gear configured to rotate on a sun gear shaft directly coupled to a rotor of the electric motor-generator; and a carrier that includes a pinion gear; and an intermediate shaft that includes an idler gear which meshes with the pinion gear and an output gear; and a differential that includes a bevel gear that directly meshes with the output gear.

In any of the aspects or combinations of the aspects, the electric drive axle may further comprise a park lock mechanism configured to selectively prevent rotation of the sun gear shaft.

In any of the aspects or combinations of the aspects, the park lock mechanism, when activated, may prevent rotation of a parking gear on the sun gear shaft.

In any of the aspects or combinations of the aspects, the sun gear shaft may extend axially through a central opening of the carrier and wherein the parking gear is coupled to a first axial end of the sun gear shaft and a rotor shaft is coupled to a second axial end of the sun gear shaft.

In any of the aspects or combinations of the aspects, the planetary gear set may only include the sun gear, the carrier, a ring gear, and a plurality of planet gears rotationally coupled to the carrier.

In any of the aspects or combinations of the aspects, the input gear of the differential may be a bevel gear.

In any of the aspects or combinations of the aspects, the electric drive axle may further comprise a one-piece housing that encloses the gearbox.

In any of the aspects or combinations of the aspects, a ring gear in the planetary gear set may be ground via the one-piece housing.

In any of the aspects or combinations of the aspects, a rotational axis of the electric motor-generator may be parallel to a rotational axis of the differential.

In any of the aspects or combinations of the aspects, the electric beam axle may further comprise a park lock mechanism selectively locking a parking gear on the sun gear shaft.

In any of the aspects or combinations of the aspects, the parking gear may be positioned on a first axial end of the sun gear shaft and a rotor shaft is directly coupled to a second axial end of the sun gear shaft.

In any of the aspects or combinations of the aspects, the sun gear shaft may extend through a central opening in the carrier.

In any of the aspects or combinations of the aspects, the electric beam axle may further comprise a bearing arranged between the sun gear shaft and the carrier.

In any of the aspects or combinations of the aspects, the three stage gearbox may be a single speed transmission.

In any of the aspects or combinations of the aspects, the planetary gear set may be a simple planetary gear set.

In any of the aspects or combinations of the aspects, the electric beam axle may further include a pair of thrust bearings coupled to opposing sides of a body of the carrier.

In any of the aspects or combinations of the aspects, the pinion gear may be positioned further axially away from the electric motor-generator than a ring gear of the planetary gear set.

In any of the aspects or combinations of the aspects, the electric beam axle may further include a park lock mechanism designed to selectively prevent rotation of the sun gear.

In any of the aspects or combinations of the aspects, the park lock mechanism may include a parking gear coupled an end of the sun gear shaft that extends through an interior opening of the carrier.

In another representation, a solid beam electrified axle is provided that comprises a fixed ratio gear train with a sun gear on a shaft directly rotationally coupled to an electric motor-generator, wherein the gear train further includes a layshaft with an idler gear rotationally coupled to a pinion gear on an extension of the carrier.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. It will therefore be appreciated that the configurations disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

As used herein, the term "substantially" and "approximately" are construed to mean plus or minus five percent or less of a range or value, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric drive axle, comprising:
an electric motor-generator;
a gearbox comprising:
a planetary gear set that includes a sun gear configured to rotate on a sun gear shaft directly coupled to a rotor of the electric motor-generator, wherein the planetary gear set includes a carrier that comprises a pinion gear; and
an intermediate shaft that includes an idler gear and an output gear coupled thereto, wherein the idler gear is rotationally coupled to the pinion gear;
a differential that includes an input gear directly coupled to the output gear; and
a park lock mechanism configured to selectively prevent rotation of the sun gear shaft.

2. The electric drive axle of claim 1, wherein the park lock mechanism, when activated, prevents rotation of a parking gear on the sun gear shaft.

3. The electric drive axle of claim 2, wherein the sun gear shaft extends axially through a central opening of the carrier and wherein the parking gear is coupled to a first axial end of the sun gear shaft and a rotor shaft is coupled to a second axial end of the sun gear shaft.

4. The electric drive axle of claim 1, wherein the planetary gear set only includes the sun gear, the carrier, a ring gear, and a plurality of planet gears rotationally coupled to the carrier.

5. The electric drive axle of claim 1, wherein the input gear of the differential is a bevel gear.

6. The electric drive axle of claim 1, further comprising a one-piece housing that encloses the gearbox.

7. The electric drive axle of claim 6, wherein a ring gear in the planetary gear set is ground via the one-piece housing.

8. The electric drive axle of claim 1, wherein a rotational axis of the electric motor-generator is parallel to a rotational axis of the differential.

9. An electric beam axle, comprising:
an electric motor-generator;
a three stage gearbox comprising:
a planetary gear set that includes:
a sun gear configured to rotate on a sun gear shaft directly coupled to a rotor of the electric motor-generator; and
a carrier that includes a pinion gear; and
an intermediate shaft that includes an idler gear which meshes with the pinion gear and an output gear;
a differential that includes a bevel gear that directly meshes with the output gear; and
a pair of thrust bearings coupled to opposing sides of a body of the carrier.

10. The electric beam axle of claim 9, further comprising a park lock mechanism selectively locking a parking gear on the sun gear shaft.

11. The electric beam axle of claim 10, wherein the parking gear is positioned on a first axial end of the sun gear shaft and a rotor shaft is directly coupled to a second axial end of the sun gear shaft.

12. The electric beam axle of claim 10, wherein the sun gear shaft extends through a central opening in the carrier.

13. The electric beam axle of claim 12, further comprising a bearing arranged between the sun gear shaft and the carrier.

14. The electric beam axle of claim 9, wherein the three stage gearbox is a single speed transmission.

15. The electric beam axle of claim 9, wherein the planetary gear set is a simple planetary gear set.

16. The electric beam axle of claim 9, wherein the pinion gear is positioned further axially away from the electric motor-generator than a ring gear of the planetary gear set.

17. The electric beam axle of claim 9, further comprising a park lock mechanism designed to selectively prevent rotation of the sun gear.

18. The electric beam axle of claim 17, wherein the park lock mechanism includes a parking gear coupled to an end of the sun gear shaft.

* * * * *